Patented Mar. 11, 1930

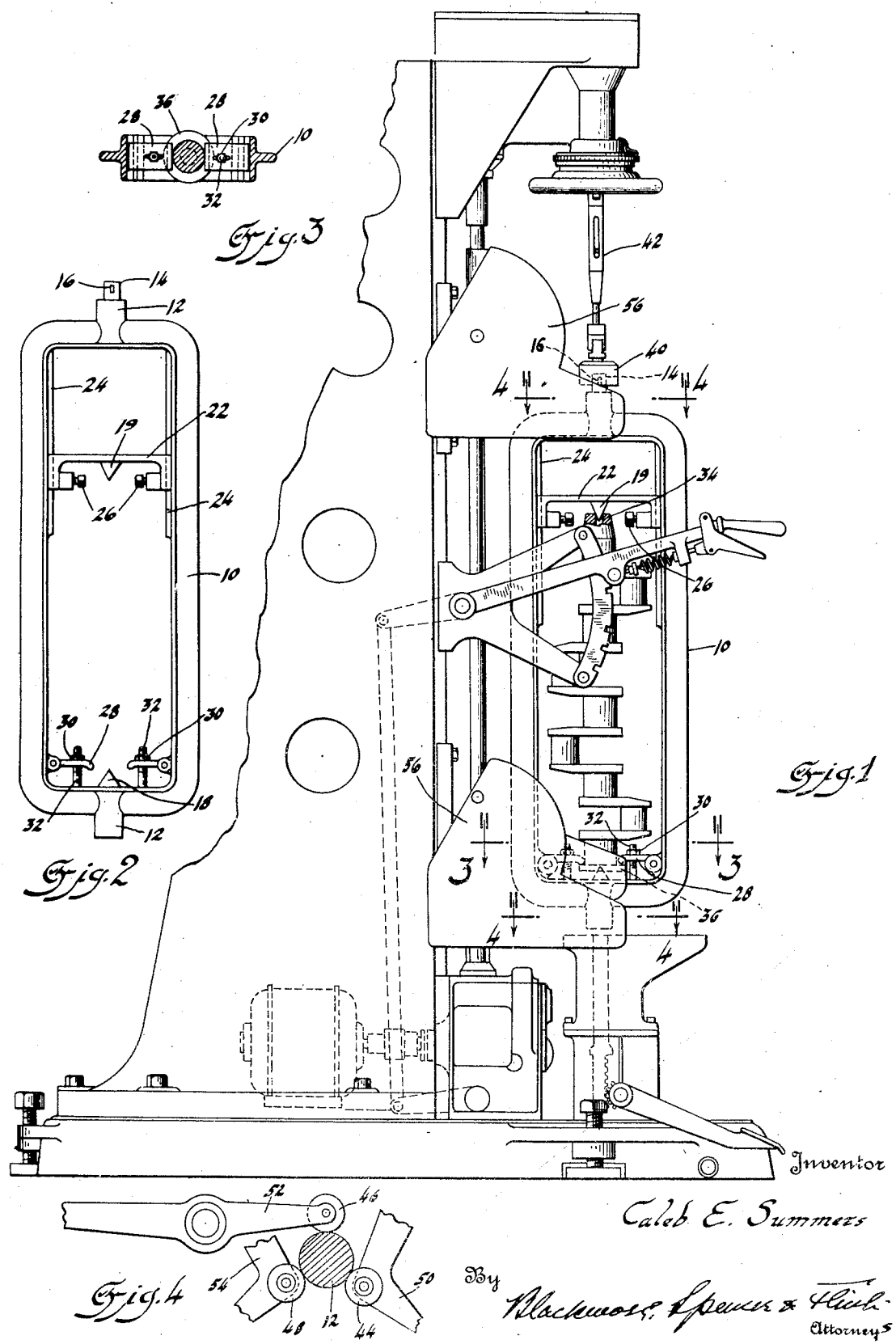

1,750,608

UNITED STATES PATENT OFFICE

CALEB E. SUMMERS, OF PONTIAC, MICHIGAN, ASSIGNOR TO GENERAL MOTORS RESEARCH CORPORATION, OF DETROIT, MICHIGAN, A CORPORATION OF DELAWARE

BALANCING-MACHINE FIXTURE

Application filed May 2, 1927. Serial No. 188,384.

This invention relates to balancing devices and particularly to means for checking rough forgings for balance. Some means for accomplishing this result is particularly desirable in the manufacture of automobile crankshafts, propeller shafts, and similar parts which are revolved at high speeds for it is essential that the parts leave the forging dies with the amount of unbalance falling within certain limits so as to make the subsequent exact balancing operation as speedy and certain as possible. By occasionally checking shafts as they come from the dies, opportunity is afforded for correcting the dies or replacing them, if necessary, and thus insure against the turning out of a long run of inaccurately forged shafts. Should the unbalance be found to be located on the same side at both ends of the shaft, an approximate correction may be made by bending the shafts.

The checking means I have provided is very simple and consists of a balanced holder in which the rough forging is secured, whereupon the holder is inserted in a suitable balancing machine and rotated. The machine then gives an indication of the amount and location of the out of balance existing in the forging, and with this information at hand, should the amount exceed the desired limits, the dies may be corrected or replaced, or the shaft bent to bring it within the limits set. I have particularly designed my holder for use with the balancing machine described and claimed in application, Serial No. 127,712 filed August 6, 1926, by Thomas C. Van Degrift and myself. However, it is obvious that with slight changes in the design of the holder it will be possible to employ it with other types of balancing machines.

In the drawing, Figure 1 shows an engine crank shaft mounted in a holder and positioned in a balancing machine of the type described in the said application. Figure 2 is a plan view of the holder with the shaft removed. Figure 3 is a section thru the holder with a shaft in place taken on line 3—3 of Figure 2. Figure 4 is a fragmentary diagrammatic view taken approximately on either of lines 4—4 of Figure 1.

My holder is best shown in Figure 2. It consists of a rectangular frame 10 provided with accurately machined end journals 12. One of the journals is provided with a reduced extension 14 equipped with keyway 16. The holder is provided with opposed conical bearing studs 18 and 19, the former rigidly mounted on the bottom of the frame 10 and the latter carried by member 22 slidably mounted on guides 24. Set screws 26 are provided to lock the member 22 in adjusted position. The adjustable mounting of the stud 19 makes it possible to mount shafts of various lengths in the holder. At the bottom of the frame 10 are pivoted members 28 adapted to be clamped into engagement with a flange on the crank shaft by turning down nuts 30 threaded on studs 32 secured to the frame and projecting through apertures in the members 28. The described holder must be very accurately balanced so that the unbalance, if any, indicated by the balancing machine is that of the shaft alone.

In the manufacture of crank shafts, the first operation after forging is drilling the centers in the ends of the shafts. It is when the shaft is in this condition and before any of the major machining operations have been performed that the shaft is tested for balance. The shaft is then mounted in the holder in the manner shown in Figure 1, with the conical studs 18 and 19 engaging the drilled centers 34 in the ends of the shaft. The movable stud 19 is locked in this position by tightening the bolts 26. The crank shaft is locked against rotation by tightening nuts 30 and thus causing members 28 to grip the flange 36 on the shaft, this flange being customarily provided for the attachment of the flywheel. The ends of the clamps 28 may be pointed but it will usually be found that in the rough state of the forging the engaged surface of flange 36 is so irregular that the arms 28 readily grip the flange.

With the shaft thus locked in the frame, the assembly is ready to be tested for balance. This may be done in any standard balancing machine. In the case of the balancing machine illustrated, the coupling device 40, suspended by means of flexible drive shaft 42, is engaged with extension 14 of bearing 12. The coupling device, which is described in detail in the said prior application, is provided with a part for engagement with keyway 16 to lock it to the frame.

When the shaft 42 is rotated the machine gives indication of the location and amount of unbalance existing in the shaft. For a complete description of the details of the machine and its mode of operation, reference is made to the said prior application. Briefly, the machine illustrated consists essentially of means for rotating the flexible shaft 42, means for holding first one end of the shaft and then the other while the opposite end is free to revolve, and means for indicating the amount and direction of eccentricity of the movement of the free end of the shaft. The amount of eccentricity is a measure of the amount of unbalance and the direction is a guide to its location. I have illustrated in Figure 4, the parts of the machine which engage the journals 12 of the frame 10, and either hold it in position or when free, operate the indicating mechanism giving the state of balance of the shaft. Thus, 44, 46 and 48 indicate rollers carried by pivoted shafts 50, 52 and 54 respectively and bearing against journals 12 at the ends of the frame 10. Lever 52 is arranged to operate the indicating mechanism, which in the machine illustrated employs a beam of light thrown on a screen by a revolving mirror, the beam being shifted back and forth along the axis of the mirror by a second mirror operated by movement of the lever 52. The beam describes a curve on the screen carried by the indicator 56, the amplitude of which indicates the amount of unbalance, and the location of the maximum point of which gives the direction of unbalance.

With the amount and location of the unbalance known, the dies may be corrected or the shafts bent as required to bring them within the limits allowed.

I claim:

1. A balancing machine fixture consisting of a balanced holder adapted to receive an article to be balanced, said holder being adapted for mounting in a balancing machine, and having parts adapted for engagement with parts of the machine to indicate the state of balance of the assembled article and fixture, said holder being provided with spaced members receiving the article between them, one of the members being adjustable to permit the reception of articles of different sizes.

2. A fixture for use in connection with balancing machines comprising a frame provided with end journals, and with cooperating spaced clamping means for securing between them an article to be balanced.

3. A readily removable fixture for use in connection with balancing machines comprising a frame provided with end journals for cooperation with the indicating mechanism of the balancing machine, means on the fixture for engaging a part to be balanced, and means for locking the article in the fixture.

4. A fixture for use in connection with balancing machines comprising a frame provided with end journals, means on the fixture for engaging the ends of a part to be balanced, one of said means being adjustable to permit the reception of articles of different sizes, and means for locking the article in the fixture.

5. A balancing machine comprising means for rotating a mass to be balanced, means for clamping one end of the mass for rotation about its geometrical axis, means for clamping the other end of the mass for rotation about its geometrical axis, means for indicating the unbalance of the free end of the mass when one of the ends is held, and an assembly for testing in said machine comprising a readily removable fixture adapted to be mounted in the machine and to be rotated thereby, said fixture being provided with parts adapted for engagement by said clamping means to restrain its movement, and means associated with the fixture for clamping an article to be balanced therein.

6. In the combination as defined in claim 5, said fixture being provided with parts adapted for engagement with the indicating means to indicate the character of motion performed by the free end thereof.

In testimony whereof I affix my signature.

CALEB E. SUMMERS.